United States Patent Office 2,719,207
Patented Sept. 27, 1955

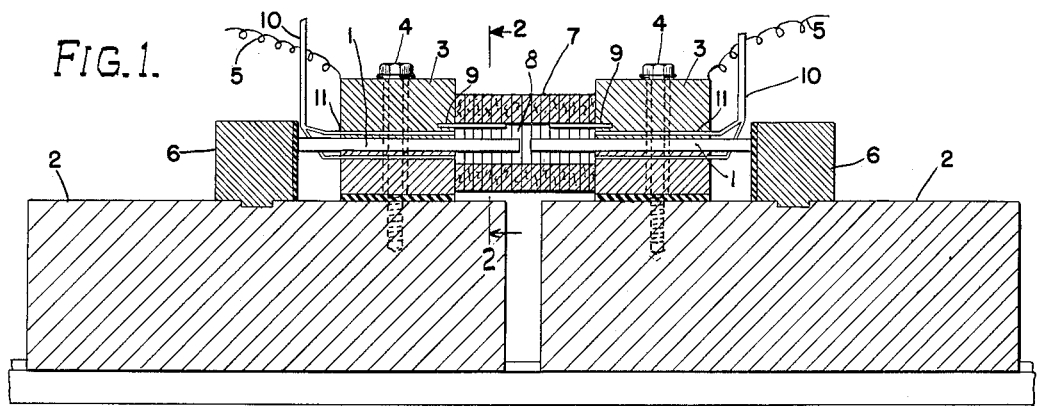
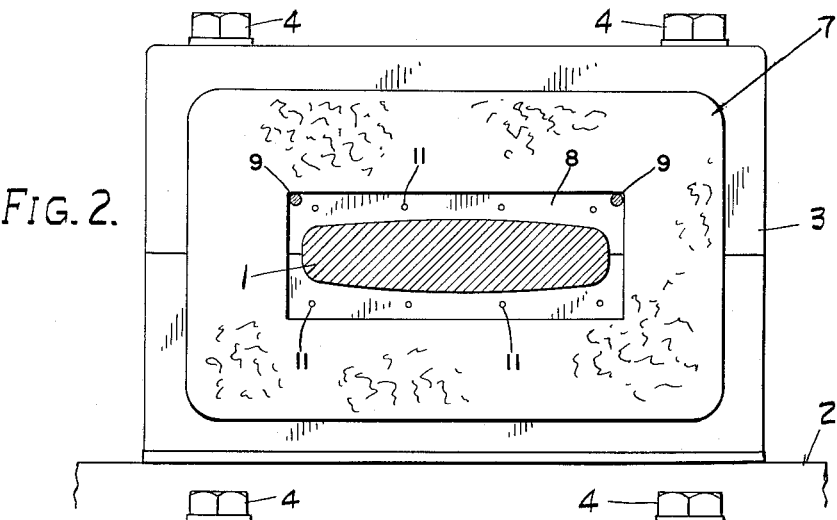
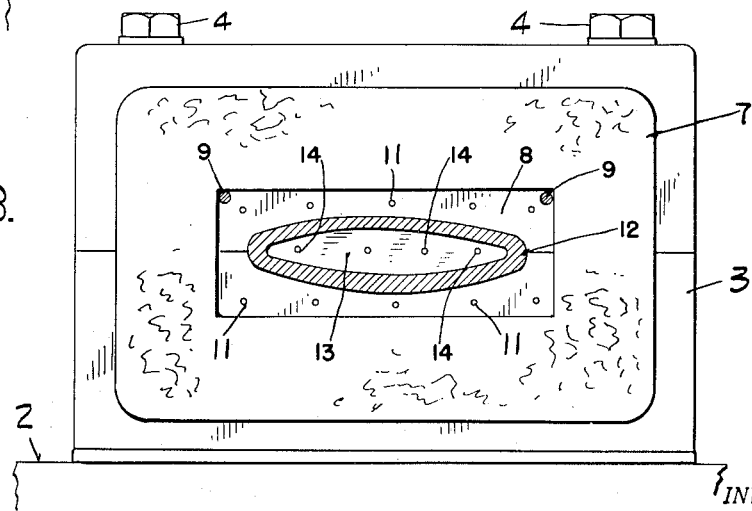
INVENTOR.
HARRIS P. MOYER

2,719,207

APPARATUS AND METHOD FOR PRODUCING A NON-OXIDIZING ATMOSPHERE FOR FLASH WELDING

Harris P. Moyer, Menomonee Falls, Wis., assignor to A. O. Smith Corporation, Milwaukee, Wis., a corporation of New York Application January 23, 1953, Serial No. 332,819

11 Claims. (Cl. 219—4)

This invention relates to a method and apparatus for producing a non-oxidizing atmosphere for flash welding.

It is desirable to flash weld in a non-oxidizing atmosphere because formation of oxide inclusions in the weld prevents proper fusion of the metal. Because flash welding requires the sections to be welded to move relatively to each other a non-oxidizing system is very difficult to attain. Attempts have been made to produce a non-oxidizing atmosphere by burning butane or other gases in the vicinity of the weld, but a completely non-oxidizing system has never been developed suitable for production scale. On a laboratory scale it is possible to evacuate all the air from the weld area. However, on a production scale this has not been practical.

An object of this invention is to provide a method and apparatus for attaining a non-oxidizing atmosphere in the area of the metal sections to be flash welded.

Another object is to provide a method and apparatus for attaining a non-oxidizing atmosphere for flash welding which is practical on a production scale.

Another object of this invention is to provide an apparatus for producing a non-oxidizing atmosphere for flash welding which serves to seal the area surrounding the parts to be welded to the ingress of oxygen and yet is able to conform to the movement of the parts without adversely affecting the sealing properties thereof.

Other objects and advantages of the invention will appear hereinafter.

Briefly the invention comprises a shield formed of a mass of substantially inert fibrous, compressible material or laminations thereof disposed to surround the ends of the articles to be welded together and being spaced therefrom to form a chamber around the articles. A non-oxidizing gas is introduced into the chamber to force out the air and combine with any remaining oxygen. After the oxygen has been removed from the chamber, the articles to be welded are bumped together compressing the material as the weld is completed.

An embodiment of the invention is illustrated in the accompanying drawing in which:

Figure 1 is a vertical section of a flash welding apparatus utilizing the present invention;

Fig. 2 is an enlarged transverse section taken along line 2—2 of Figure 1; and

Fig. 3 is a view similar to Fig. 2 showing another embodiment of the invention.

Referring to the drawing there is shown an apparatus for flash welding the adjacent ends of two metal sections or articles 1 together. The apparatus consists of a pair of platens 2 mounted on a suitable platform and disposed in spaced relation, one or both of the platens being adapted to be moved relatively to the other. A clamping member 3 is mounted on the upper surface of each platen at the inner ends thereof and members 3 are suitably insulated from the platens. Clamping members 3 may be of any desired structure with those shown in the drawing consisting of an upper and lower half which are connected together and secured to the platens 2 by bolts 4. The metal sections 1 to be welded are secured between the halves of the respective clamping members with the inner ends of the sections aligned in a spaced opposed relation.

A pair of suitable electrical leads 5 are connected to the respective clamping members 3 and current flows through sections 1 and across the gap therebetween to heat the adjacent end portions of the articles.

On bumping the heated ends of the metal sections 1 together by operation of one or both platens 2 to effect flash welding of sections 1, the sections are prevented from being displaced outwardly by a pair of thrust blocks 6 which are secured to the upper surface of the respective platens 2 and bear against the outer ends of the respective metal sections. The thrust blocks 6 are suitably insulated from sections 1.

In order to curb the presence of oxygen in the vicinity of the weld of metal sections 1, a shield 7 is disposed around the sections and between the clamping members 3, and a non-oxidizing fluid is introduced within the shield. The shield 7 may be formed as a single mass or a plurality of laminations of batts of material and is preferably composed of an electrically insulating material. The material should be substantially inert so that it will not react with the weld metal which may be thrown out during welding and should not decompose or give off any gases or vapors at the elevated temperatures of welding which may have a deleterious effect on the weld.

In addition, the material of the shield should be compressible so that the shield may move with metal sections 1 as the same are bumped together during welding rather than the sections sliding or moving relatively to the shield.

It has been found that a fibrous glass material incorporates the above properties and is particularly suitable for the shield 7. The glass may be readily formed into the shield either by wrapping the material about the sections 1 or it may be employed as a series of batts. The glass fiber is an electrical insulator, has a high melting temperature and is substantially inert. The glass in this fibrous form is readily compressible and is porous enough to permit the purging fluid to pass outwardly therethrough.

In addition the fibrous glass material has the desirable property of retaining the molten metal particles thrown out during the flashing and bumping operations. These outwardly thrown particles of molten metal contact the glass fiber shield causing the glass to fuse and physically hold the molten metal, thus preventing the metal from being deflected back into the weld.

The shield is spaced outwardly from sections 1 to provide a chamber or clearance 8 around the sections. The ends of chamber 8 are closed by the inner faces of clamping members 3.

If the shield 7 is composed of a series of laminations, the laminations may be provided with centrally aligned openings having the general, but enlarged, configuration of the sections to be welded so that chamber 8 is provided around the sections. The shield is supported and maintained out of contact with the sections by a plurality of pins or dowels 9 which extend inwardly from the respective clamping members 3 within the clearance 8 and serve to support the shield.

To purge the chamber 8, surrounding the sections to be welded, of oxidizing agents such as air, a non-oxidizing fluid under a positive pressure is introduced into the chamber. The fluid is conveyed from a storage source through lines 10 to openings 11 which are formed in clamping members 3 and communicate with the chamber 8. The fluid enters the chamber under a positive pressure, slightly above atmospheric, and forces the original air outwardly from the chamber through the porous shield 7.

After the original air has been entirely displaced by the non-oxidizing fluid, the fluid is continuously introduced into the chamber at a positive pressure to prevent the ingress of air into the welding area. Thus there is a constant flow of non-oxidizing fluid into chamber 8 through openings 11 and outwardly from the chamber through the porous shield during the heating and bumping operations.

The non-oxidizing fluid may take the form of a generally inert gas, such as nitrogen, or a reducing gas such as butane, carbon monoxide or the like. A very desirable fluid from the standpoint of safety and effectiveness is a gas composed essentially of nitrogen or other inert gases and a small amount of reducing gases such as hydrogen or carbon monoxide. This mixture will effectively prevent oxidation of the weld metal with the reducing components tending to combine with any oxygen remaining within the shield, and yet the mixture may be emitted directly into the atmosphere without danger of explosion or toxic effect.

Fig. 3 illustrates another embodiment of the invention for use in flash welding the ends of hollow metal sections 12. Sections 12 are secured within the clamping members 3 and encased by shield 7 in a manner similar to that employed with the solid sections 1.

To prevent the purging non-oxidizing gas from escaping through the open ends of the sections 12, a plug 13 having a contour corresponding to the internal cross section of the respective sections is disposed within each section 12 adjacent the end of the section to be welded.

In order that air is not trapped within the hollow end of the section 12 inwardly of the plugs 13, the plugs are provided with a plurality of openings 14 which communicate with a non-oxidizing fluid source, not shown. Thus the non-oxidizing fluid is introduced into the chamber 8 both around the outer surface of the sections 12 and also from within the sections.

In the operation of the present apparatus the metal sections 1 are initially secured within the clamping members 3, and the shield 7, either in the form of a unitary mass or a series of laminations, is disposed about the sections. The platens 2 are then moved toward each other until the opposed ends of the sections 1 are in proper position for heating. At this time shield 7 should be closed at the ends by the clamping members 3.

Prior to and during heating by arcing of the current between the opposed ends of the sections, the non-oxidizing fluid is introduced into chamber 8 so that on completion of heating the chamber will be completely purged of oxygen. After heating to the proper temperature, the platens 2 are moved toward each other causing the opposed heated ends of the sections 1 to be bumped together to effect the weld with the non-oxidizing fluid being introduced into the chamber 8 during the bumping operation to insure a non-oxidizing atmosphere.

The present invention provides an extremely simple and effective means of producing a non-oxidizing atmosphere for flash welding.

As the shield 7 is composed of a compressible material such as fiber glass and as it is restrained against outward movement at its ends by the pair of clamping members 3, the shield will compress in length as the sections 1 are moved together to effect the weld. Not only is the sealing effect of the shield maintained during the movement but at the time of bumping the shield will be compressed and provide even greater protection against the entry of oxygen. The ends of the shield are maintained in fixed relation to the respective sections 1, there being no relative sliding movement therebetween which would permit an ingress of oxygen adjacent the sliding surfaces.

Various embodiments of the invention may be employed within the scope of the following claims.

I claim:

1. A shield for use with a welding apparatus adapted to weld the ends of two metal sections together, said ends to be welded being held in opposed aligned relationship by a pair of clamping members and adapted to be brought into contacting relation as said clamping members are moved relative to each other, said shield comprising a mass of porous, substantially inert, compressible material extending between said pair of clamping members and having a longitudinal opening therethrough, said ends to be welded being disposed within said opening and spaced from said mass of material, and means to purge said opening with non-oxidizing gases prior to and during welding to remove oxidizing agents therefrom outwardly through the porous material and prevent the formation of oxide inclusions in the weld.

2. A flash welding apparatus adapted to weld the ends of two metal articles together, which comprises a pair of clamping members adapted to move relative to each other, one of said metal articles being removably secured in one of said clamping members and the other of said metal articles being removably secured in the other of said clamping members, the ends of said articles being in opposed alignment and adapted to be brought into contact as the clamping members move relative to each other, a mass of fibrous glass material disposed between said pair of clamping members, said mass having an opening therethrough to form a chamber with the aligned ends of said articles being disposed within said chamber, means to purge said chamber with non-oxidizing gases before and during welding to remove oxidizing agents therefrom outwardly through the fibrous glass material to prevent formation of oxide inclusions in the weld, and means to heat the opposed ends of the said metal articles in preparation for welding thereof, said clamping members being moved relative to each other to effect a bumping of the heated ends of the metal articles to weld said articles together with said mass of material being compressed by the movement of said members and substantially retaining the original cross-sectional configuration of the mass throughout its length.

3. A flash welding apparatus adapted to weld the ends of two metal articles together, which comprises a pair of clamping members adapted to move relative to each other, one of said metal articles being removably secured in one of said clamping members and the other of said metal articles being removably secured in the other of said clamping members, the ends of said articles being in opposed alignment and adapted to be brought into contact as the clamping members move relative to each other, a plurality of laminations being disposed between said pair of clamping members and being formed of fibrous glass material, said laminations having aligned openings therethrough to form a chamber with the opposed ends of said articles being disposed within said chamber and spaced from said laminations, means to purge said chamber with non-oxidizing gases prior to and during welding to remove oxidizing agents therefrom outwardly through the fibrous glass material, and means to heat the said opposed ends of the said metal articles in preparation for welding thereof, said clamping members and the metal articles removably secured therein being moved relative to each other to effect a bumping of the heated ends of the metal articles to weld said articles together with said laminations being compressed by the movement of said members and substantially retaining the original cross-sectional configuration of the laminations.

4. A flash welding apparatus adapted to weld the ends of two metal articles together, which comprises a pair of clamping members adapted to move relatively to each other, one of said metal articles being removably secured in one of said clamping members and the other of said metal articles being removably secured in the other of said clamping members, the ends of said articles being in opposed alignment and adapted to be brought into contact as the clamping members move relatively to each other, a mass of substantially inert, porous, compressible material disposed between said pair of clamping members, said mass having a longitudinal opening therethrough to form a chamber with the aligned ends of said articles being disposed within said chamber and spaced from said mass of material, means to purge said chamber with a substantially inert fluid before and during welding to remove oxidizing agents therefrom, said inert fluid serving to force the oxidizing agents from said chamber through said porous mass, and means to heat the opposed ends of the said metal articles in preparation for welding thereof, said clamping members and the metal articles removably secured therein being moved relatively to each other to effect a bumping of the opposed ends of the metal articles to weld said articles together with said mass of material being compressed by the movement of said members to continually protect said weld from the ingress of oxygen.

5. In a flash welding apparatus adapted to weld the ends of two metal articles together, a pair of clamping members adapted to move relatively to each other, one of said metal articles being removably secured in one of said clamping members and the other of said metal articles being removably secured in the other of said clamping members, the ends of said articles being in opposed alignment and adapted to be brought into contact as the clamping members move relatively to each other, a mass of fibrous glass material disposed between said pair of clamping members with the ends of said mass being fixed in relation to the respective metal articles, said mass having an opening therethrough to form a chamber with the opposed ends of said articles being disposed within said chamber and spaced from said mass, and means to purge said chamber with a substantially reducing fluid prior to and during welding to combine with and remove oxidizing agents therefrom outwardly through the fibrous glass material to prevent the formation of oxide inclusions in the weld, said clamping members being moved relatively to each other to effect a bumping of the opposed ends of said metal articles to weld said articles together with said mass of material being compressed during movement of said members to continually protect said weld from the ingress of oxygen.

6. In a flash welding apparatus adapted to weld the ends of two metal articles together, a pair of clamping members adapted to move relatively to each other, one of said metal articles being removably secured in one of said clamping members and the other of said articles being removably secured in the other of said clamping members, the ends of said articles being in opposed alignment and adapted to be brought into contact as the clamping members move relatively to each other, a mass of substantially inert, porous, compressible material disposed about said metal articles to form a chamber thereabout with the ends of said mass being fixed in relation to the respective metal articles, and a conducting member communicating with said chamber for introducing a non-oxidizing fluid therein prior to and during welding to remove oxidizing agents from the chamber and prevent the formation of oxide inclusions in the weld, said fluid comprising a combination of an inert fluid to force oxidizing agents from said chamber through said porous mass and a reducing fluid to remove oxidizing agents by combining with said agents, said clamping members and the metal articles removably secured therein being moved relatively to each other to effect a bumping of the said ends of the metal articles to weld said articles together with said mass of material being compressed during movement of said members.

7. In a flash welding apparatus adapted to weld the ends of two hollow metal articles together, a pair of clamping members adapted to move relatively to each other, one of said hollow articles being removably secured in one of said clamping members and the other of said hollow articles being removably secured in the other of said clamping members, the ends of said articles being in opposed alignment and adapted to be brought into contact as the clamping members move relatively to each other, a mass of porous, substantially inert, compressible material disposed between said pair of clamping members and having an opening therethrough to form a chamber with the ends of said hollow articles being disposed within said chamber and spaced from said mass of material, a plug provided within said hollow articles at the ends to be welded together and serving to close off the hollow interior of the articles, and a conducting member communicating with said chamber for introducing a non-oxidizing gas therein prior to and during welding of the ends together to remove oxidizing agents from the chamber outwardly through the porous material to prevent formation of oxide inclusions in the weld, said clamping members and the hollow articles removably secured therein being moved relatively to each other to effect a bumping of the said ends of said hollow articles to weld said articles together with said mass of material being compressed during movement of said members.

8. A method of welding the ends of two metal articles together, which comprises securing the said metal articles with the ends to be welded in opposed aligned relation, enclosing the spaced ends of the articles with a mass of porous, substantially inert, compressible material, purging the space between the articles and compressible material with non-oxidizing gases prior to and during welding to remove oxidizing agents therefrom outwardly through the porous material to prevent formation of oxide inclusions in the weld, heating the ends of said articles in preparation for welding thereof, and forcing the ends of said articles together to effect a weld thereof with said mass of material being compressed during movement of said articles.

9. A method of flash welding the ends of two metal articles together, which comprises clamping the said metal articles with the ends to be welded in opposed aligned relation within a pair of clamping members, surrounding said articles with a series of laminations formed of a fibrous glass material, each of said laminations having a longitudinal hole therethrough aligned with a like hole in adjacent laminations to form a chamber, said series of laminations being restrained at the ends thereof in fixed relation to the respective articles, purging said chamber with a substantially inert gas prior to and during welding to remove oxidizing agents therefrom to prevent formation of oxide inclusions in the weld, said gas being admitted under positive pressure to force said oxidizing agents from said chamber through the fibrous glass material of said laminations, heating the ends of said articles in the inert atmosphere in preparation for welding thereof, and moving said clamping members relative to each other to effect a bumping of the ends of the articles together to effect a weld therebetween with said laminations being compressed during movement of said members.

10. In a method of flash welding the ends of two metal articles together, clamping the articles with the ends to be welded in opposed aligned relation within a pair of clamping members, said clamping members being adapted to move relatively to each other, enclosing said articles with a mass of substantially inert, fibrous, compressible material with said articles being spaced from said mass to provide a clearance between said articles and said mass, said mass being restrained at the ends thereof by said clamping members, purging said clearance with a reducing gas prior to and during welding to combine with and remove oxidizing agents therefrom outwardly through the fibrous material to prevent formation of oxide inclusions in the weld, and moving said clamping members relative to each other to effect a bumping of the ends of the articles together to effect a weld therebetween with said mass being compressed during movement of said members to continually protect said weld from the ingress of oxygen.

11. A method of flash welding the ends of two metal articles together, which comprises securing said metal articles with the ends to be welded in opposed aligned relation within a pair of clamping members, said clamping members being adapted to move relatively to each other, surrounding said articles with a mass of substantially inert, porous, compressible material with said articles being spaced from said mass to provide a clearance between said articles and said mass, said mass being restrained at the ends by said clamping members, purging and clearance with non-oxidizing gases prior to and during welding to remove oxidizing agents therefrom, said gases comprising a combination of inert gas to force oxidizing agents from said clearance through said porous mass and reducing gas to combine with said agents, heating the ends of said articles in the non-oxidizing atmosphere in preparation for welding thereof, and moving said clamping members relative to each other to effect a bumping of the ends of the articles together to effect a weld therebetween with said mass being compressed during movement of said members to continually protect said weld from the ingress of oxygen.

References Cited in the file of this patent

UNITED STATES PATENTS

| 1,552,369 | White | Sept. 1, 1925 |
| 1,978,891 | Blumberg et al. | Oct. 30, 1934 |
| 2,326,296 | Harrison et al. | Aug. 10, 1943 |
| 2,549,804 | Graham | Apr. 24, 1951 |

FOREIGN PATENTS

| 463,802 | Great Britain | Apr. 7, 1937 |